United States Patent
Brown, Jr. et al.

(10) Patent No.: US 9,304,660 B1
(45) Date of Patent: Apr. 5, 2016

(54) SYSTEM AND METHOD FOR GENERATING A USER INTERFACE BY AUCTIONING SPACE ON THE USER INTERFACE TO SELF-DETERMINING, CONTENT-PROVIDING MODULES

(75) Inventors: James Ward Brown, Jr., Flitton (GB); Nicholas James Alexander Black, San Francisco, CA (US)

(73) Assignee: Cloudmade Limited, London (GB)

( * ) Notice: Subject to any disclaimer, the term of this patent is extended or adjusted under 35 U.S.C. 154(b) by 255 days.

(21) Appl. No.: 13/410,290

(22) Filed: Mar. 1, 2012

(51) Int. Cl.
*G06F 3/0484* (2013.01)
*G06F 9/44* (2006.01)

(52) U.S. Cl.
CPC .............. *G06F 3/0484* (2013.01); *G06F 8/38* (2013.01)

(58) Field of Classification Search
None
See application file for complete search history.

(56) References Cited

U.S. PATENT DOCUMENTS

| | | | |
|---|---|---|---|
| 6,662,177 B1* | 12/2003 | Martino et al. | |
| 6,668,177 B2* | 12/2003 | Salmimaa et al. | 455/566 |
| 6,724,403 B1* | 4/2004 | Santoro et al. | 715/765 |
| 7,076,742 B1* | 7/2006 | Thorn et al. | 715/853 |
| 7,933,632 B2* | 4/2011 | Flynt et al. | 455/569.1 |
| 8,185,819 B2* | 5/2012 | Sah et al. | 715/243 |
| 8,819,726 B2* | 8/2014 | Wetzer et al. | 725/32 |
| 2002/0024536 A1* | 2/2002 | Kahan et al. | 345/745 |
| 2002/0124256 A1* | 9/2002 | Suzuka | 725/55 |
| 2003/0063128 A1* | 4/2003 | Salmimaa et al. | 345/810 |
| 2003/0217121 A1* | 11/2003 | Willis | 709/219 |
| 2003/0217328 A1* | 11/2003 | Agassi et al. | 715/500 |
| 2004/0001087 A1* | 1/2004 | Warmus et al. | 345/745 |
| 2004/0003096 A1* | 1/2004 | Willis | 709/228 |
| 2004/0003097 A1* | 1/2004 | Willis et al. | 709/228 |
| 2004/0070620 A1* | 4/2004 | Fujisawa | 345/764 |
| 2004/0194131 A1* | 9/2004 | Ellis et al. | 725/34 |
| 2006/0150094 A1* | 7/2006 | Patrawala | 715/520 |
| 2006/0236251 A1* | 10/2006 | Kataoka et al. | 715/757 |
| 2007/0180401 A1* | 8/2007 | Singh et al. | 715/794 |
| 2008/0066011 A1* | 3/2008 | Urrabazo et al. | 715/810 |
| 2008/0172372 A1* | 7/2008 | Shacham et al. | 707/5 |
| 2010/0100845 A1* | 4/2010 | Khan et al. | 715/810 |
| 2010/0117810 A1* | 5/2010 | Hagiwara et al. | 340/425.5 |
| 2010/0146448 A1* | 6/2010 | Takahashi et al. | 715/835 |

* cited by examiner

*Primary Examiner* — Barry Drennan
*Assistant Examiner* — Jason Pringle-Parker
(74) *Attorney, Agent, or Firm* — Lessani Law Group, PC (57) ABSTRACT

A system and method is provided for generating a dynamic, user interface that is capable of frequently changing and learning to provide the most relevant information to the user. The method includes executing a plurality of user interface (UI) modules on a computing device. Each UI module is a software component that provides content for display in the user interface. Each UI module determines its own content and its own priority level and bids for user interface space using its determined priority level. A UI controller is executed on the computing device. The UI controller is a software component that receives bids for the UI modules, determines the number of available spots for UI modules in the user interface, and selects UI modules associated with the highest priority for display in the available user interface spots.

16 Claims, 7 Drawing Sheets

SYSTEM AND METHOD FOR GENERATING A USER INTERFACE BY AUCTIONING SPACE ON THE USER INTERFACE TO SELF-DETERMINING, CONTENT-PROVIDING MODULES

BACKGROUND OF THE INVENTION

1. Field of the Invention

This invention relates generally to user interfaces and, more particularly, to a system and method for selecting content for a user interface 2. Description of the Background Art As people are increasingly using mobile phones, navigation devices, tablets, and other computing devices, there is a need for user interfaces on such devices that can dynamically provide a user with a variety of up-to-date information relevant to the user. For example, at present, navigation devices offer a user the benefit of directing him or her to his or her intended destination, as well as basic internet search capabilities for finding local attractions and related general information. While this level of functionality is, without a doubt, useful to the user, as more and more computing devices are being brought into the realm of greater interactivity, users will soon expect to have more information at their fingertips, which is tailored to them and specific to their interest.

For example, a user may not just want to know where the local gas stations are located, but will want to know which gas stations along their route are in a price range that they would consider stopping at. This requires the system to know or learn the user's behavior. The user may want to know where his or her friends are located and the local venues they are currently visiting. The user may want to know which local venues are hosting events or offering specials on products or services related to his or her interests.

Known user interfaces on navigation devices, mobile phones, and other computing device are not designed to provide the user with a plurality of information that frequently changes based on the user's likely interest and context (e.g., location, whether driving, etc.). One of the challenges of providing such an interface is determining what content to display on the interface at any time. Traditional interface generation software uses a centralized process to determine what to display on the interface at any given time. One of the difficulties in providing a dynamic user interface that is constantly capable of changing is that, for a centralized process to decide what content is most important, requires a large, complex set of rules that needs to be updated every time a new content category is added. Such application would be a monolithic application that would have to consider all possible content possibilities and decide what content to display. Therefore, there is a need for a system and method that can more easily provide a dynamic, user interface that is capable of frequently changing (and learning) to provide the most relevant information to the user. One area in which this need is especially felt is in navigation devices and navigation applications.

SUMMARY OF THE INVENTION

The present invention is directed to a system and method for generating a user interface by auctioning space on the interface to a plurality of self-determining UI modules.

A plurality of user interface (UI) modules is executed on a computing device. Each UI module is a software component that provides content for display in the user interface. Each UI module determines its own content and its own priority level and bids for user interface space using its determined priority level. A UI controller is executed on the computing device. The UI controller is a software component that receives bids for the UI modules, determines the number of available spots for UI modules in the user interface, and selects UI modules associated with the highest priority for display in the available user interface spots.

In certain embodiments, the UI controller informs the UI modules whether or not they won space in the user interface. It also may report clicks to the UI modules that are clicked on. Each UI module displayed in the user interface may use information on whether or not it was clicked on when displayed in the user interface in determining future priority levels.

In certain embodiments, the UI controller monitors bids from UI modules and, in response to receiving a bid from a UI module with a higher priority than a UI module currently being displayed in the user interface, the UI controller replaces the currently-displayed UI module with the UI module having the higher priority.

In certain embodiments, the user interface has a plurality of modes and the UI controller determines the number of available spots for UI modules in the user interface based on the current mode of the user interface.

In certain embodiments, data in various categories is downloaded to the computing device. Each UI module then ranks data relevant to its categories and determines its content by selecting the highest-ranked data. A UI module may use user profile information, current context, and past user click history to determine a priority associated with the highest-ranked data. The user profile information may include past behavior and expressed user interests, such as, for example places the user has been and content on which the user has clicked in the user interface.

In certain embodiments, the UI controller is able to upgrade or downgrade a UI module's priority. The UI controller may adjust priority levels of UI modules based on the type of information the UI module displays.

In certain embodiments, the computing device is a navigation device.

DETAILED DESCRIPTION OF THE PREFERRED EMBODIMENTS

The present invention provides a system, software application, and method for generating a dynamic, user interface that is capable of frequently changing and learning to provide the most relevant information to the user. Specifically, the present invention provides a tailored, self-learning user interface (UI) system with (1) a plurality of UI modules, where each individual UI module is a software component that determines its own content and interest level to the user, and (2) a UI controller that determines the number of available spots on the user interface and selects UI modules for display in the interface based on the individual module's self-determined priority (i.e., interest level to the user).

Figure 1:
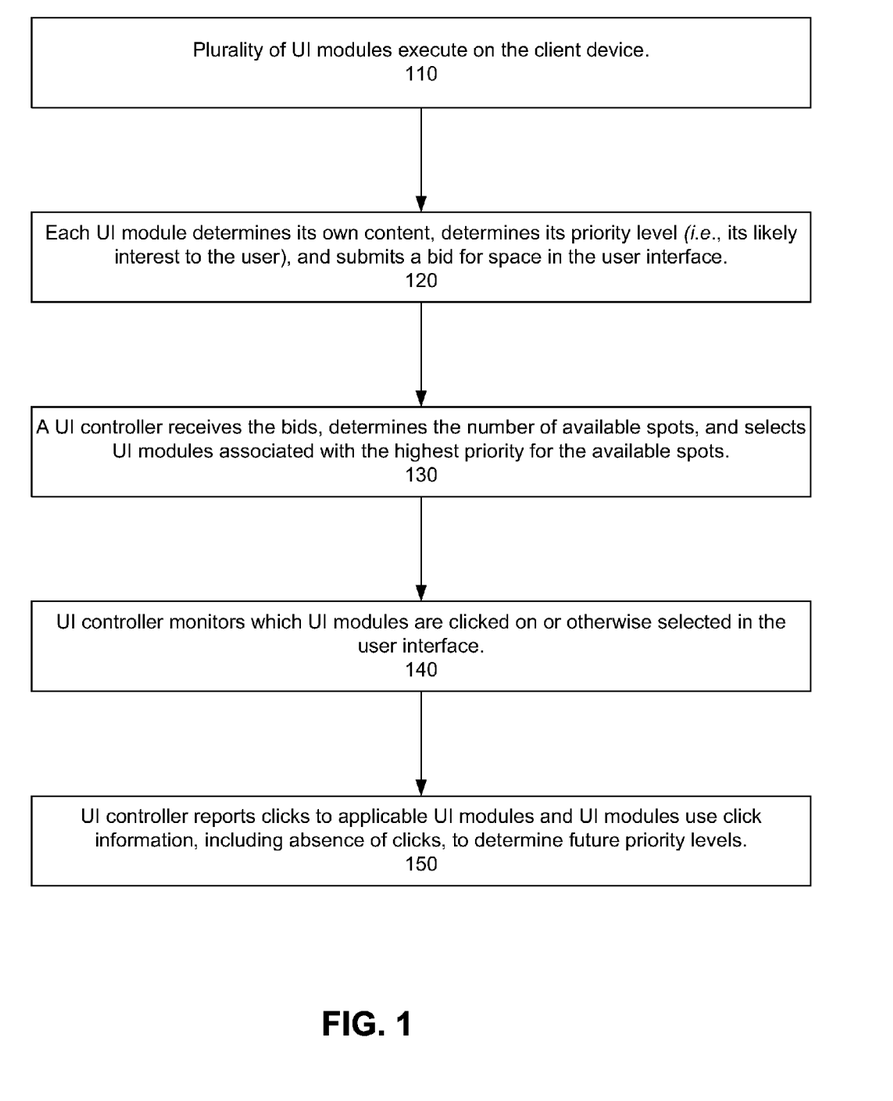
FIG. 1 is a flowchart that illustrates a general method for determining content for a user interface.

As seen in the method of FIG. 1, a plurality of UI modules are executed on the client device (step 110). The client device may be any computing device, such as a mobile phone (e.g., IPHONE, ANDROID phone, etc.), personal digital assistant, or a portable or in-dash navigation device.

Each UI module determines its own content, determines its priority level (i.e., its likely interest to the user), and submits a bid for space in the user interface (step 120). In other words, each UI module essentially acts as its own agent and bids for a spot on the user interface. Examples of possible UI modules include modules related to gas prices, friends, events, deals, attractions along a route, eco-driving tips, to do list, weather, traffic and road alerts, a drive list, and many more.

For example, a "Deals" module may evaluate the deals of a number of venues in the vicinity of the user. Based on the user's profile indicating that he or she loves chocolate and the user's prior history of visiting the Ghiradelli Ice Cream and Chocolate store, the module may rank Ghiradelli's deal as being higher than other deals in the area. But since the user sometimes stops off at Ghiradelli's when a deal if offered to him or her, but sometimes does not stop off, the module may bid for a space in the user interface with medium priority level. On the other hand, a "Weather" module may receive data regarding a fast approaching hailstorm, may rank this information more important than other local weather information and submit a bid in the user interface with a high priority level.

Figure 5A:
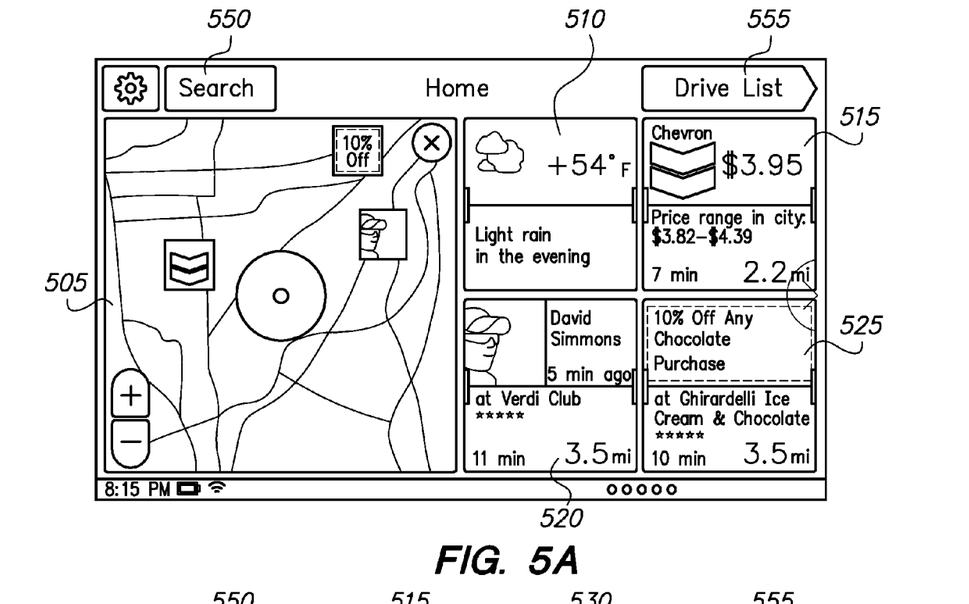
FIGS. 5A and 5B illustrate exemplary implementations of the user interface in a "Dashboard Mode."
Figure 5B:
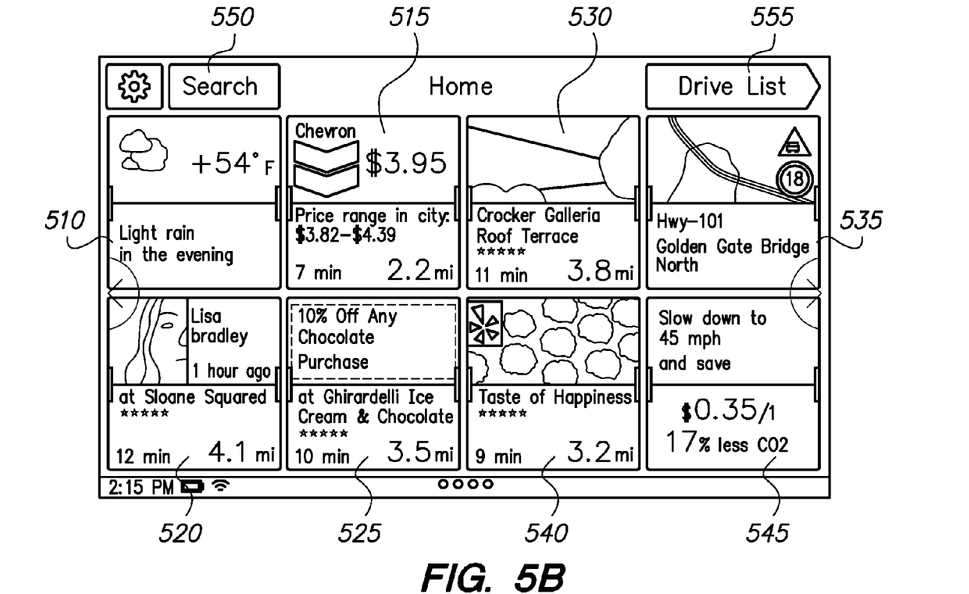

A UI controller then receives the bids, determines the number of available spots, and selects the UI modules associated with the highest priority for the available spots (step 130). The number of available spots is determined at least in part based on the mode of the user interface. FIG. 5A illustrates a user interface on a navigation device that is in a mode with a map plus four available spots (currently filled by UI modules 510, 515, 520, and 525). FIG. 5B illustrates a user interface on a navigation device that is in a mode that has six available spots (currently filled by UI modules 510, 515, 520, 530, 535, 540, 545). Once the number of available spots is determined, the controller then selects which UI modules are allotted a spot based on the modules self-determined priority levels.

In the preferred embodiment, a user "clicks" on a displayed UI module to obtain more information about the information/content displayed by the UI module. The UI controller monitors which UI modules are clicked on or otherwise selected in the user interface (step 140), as this provides valuable feedback on how interesting the user finds the content of the UI module. The UI controller will report the clicks to the applicable UI modules. The UI modules use the click information, including absence of clicks, to determine future priority levels (step 150).

The importance of clicks in determining priority may vary among the UI modules. For example, a user may be interested in the weather forecast, but may not be likely to click on Weather module to get details of the forecast. However, if a user is interested in nearby deals, they are more likely to click on a Deals module. Therefore, the number of clicks a Deals module receives may be more indicative of user interest in the module than the number of clicks a Weather module receives. In such case, the Deals module would rely on click feedback more heavily than the Weather module in setting future priority levels.

Figure 2:
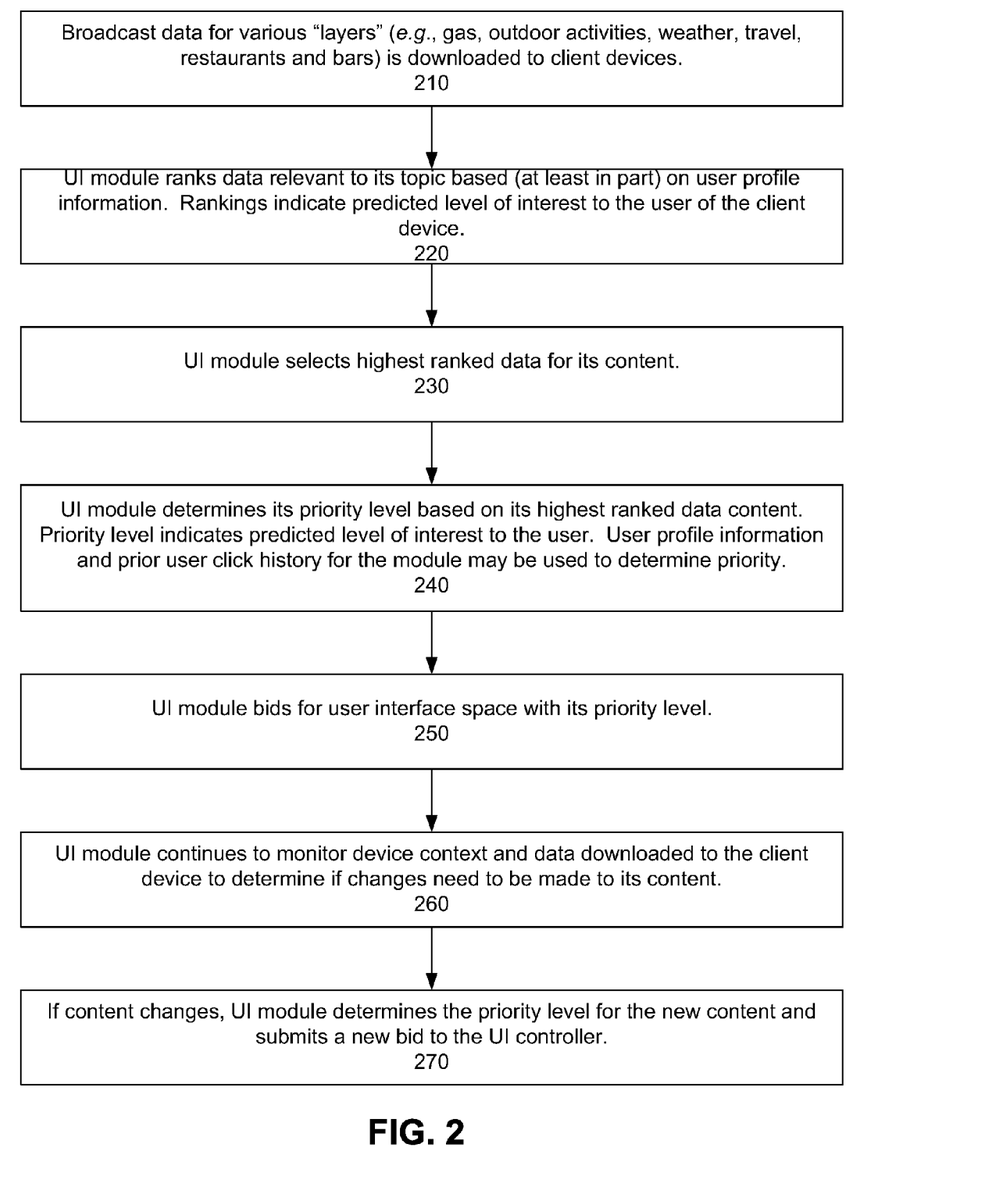
FIG. 2 is a flowchart that illustrates the operation of the user interface (UI) modules.

FIG. 2 describes the operation of a UI module in greater detail. Initially, the broadcast data for various "layers" (e.g., gas, outdoor activities, shopping, weather, travel, restaurants and bars) is downloaded to the client devices (step 210). A layer is a collection of categories. For example, one layer may be "restaurants and pubs." Another layer may be "outdoors." Also, data specific to a user, such as data from social website (e.g., FACEBOOK) may be downloaded to the client device. Each UI module then ranks data relevant to its topic (step 220). For many UI modules, the rankings are based (at least in part) on user profile information. User profile information may include any number of data. For example, it may include the user's preferences, past behavior, places the user has been, content on which the user has clicked, information from user's preferences and activities on social websites (e.g., FACEBOOK) and many more. Rankings also may be based on the current context of the device (e.g., location, whether driving, etc.) Ranking indicates a predicted level of interest to the user of the client device.

The UI module then selects it highest ranked data for its content (step 230). For the content it has selected, the UI module determines its own priority level, usually taking into account user profile information and prior user click history (step 240). The UI module also may take into account the context of the client device in determining its priority level. The UI module then bids for user interface space with its priority level by sending its priority level to the UI controller (step 250). In one embodiment, the priority range is 1-100, with 1 being the lowest priority and 100 being the highest priority.

Regardless of whether it is chosen by the UI controller for a space on the user interface, the UI module continues to monitor the client device's context and data downloaded to the client device to determine if changes need to be made to its content (step 260). Context may include the GPS location of the computing device, the operating mode of the computing device, the type of network the device is communicating on, and the power usage of the device, among other situations. If the UI module determines that it needs to change its content, the UI module determines the priority level for the new content and submits a new bid to the UI controller (step 270).

Figure 3:
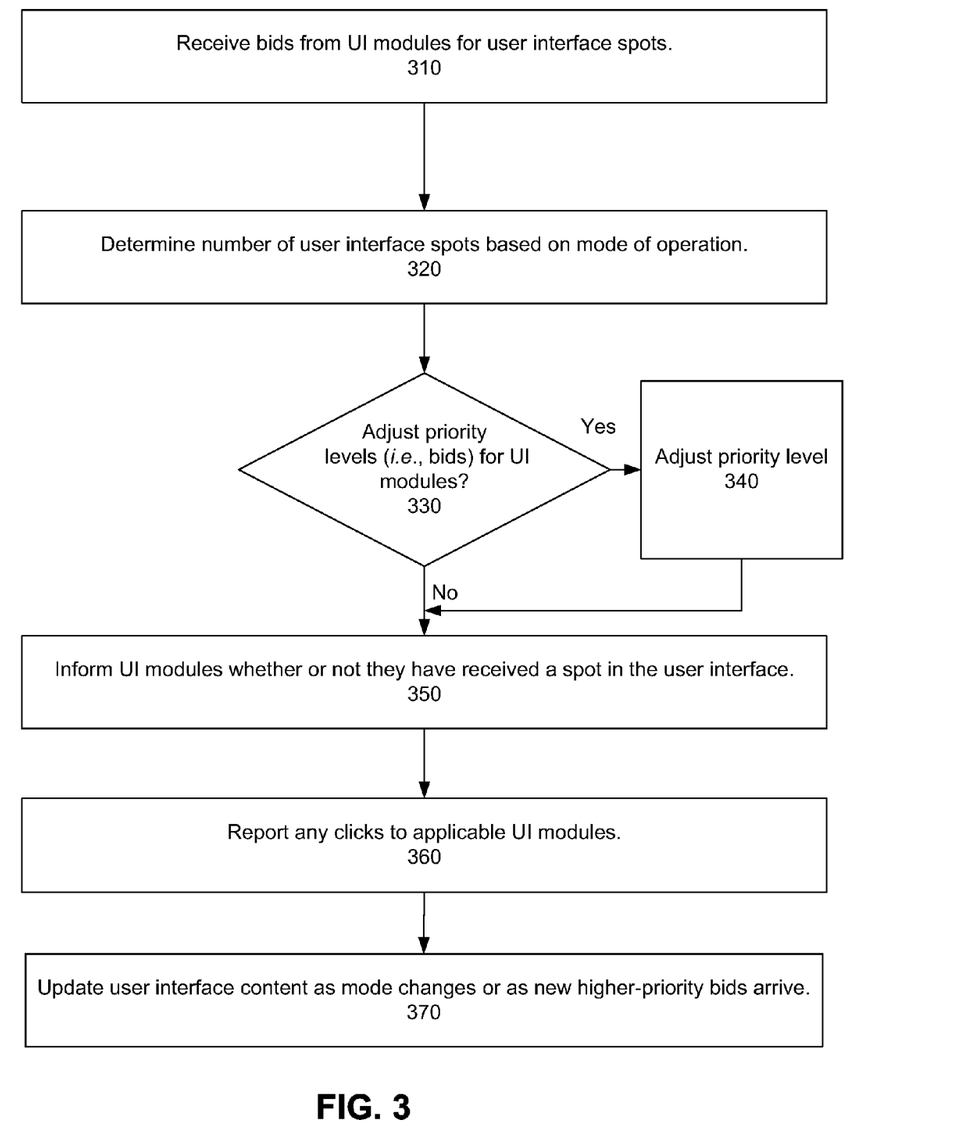
FIG. 3 is a flowchart that illustrates the operation of the UI controller.

FIG. 3 illustrates the auction process for user interface space. The UI controller receives bids from the UI modules for user interface spots (step 310). It then determines the number of user interface spots based on the mode of operation (step 320). The modes illustrated in FIGS. 5A, 5B, and 6 for a navigation device are three examples among numerous possibilities. Different types of devices will likely have different types of modes. Each mode may have any number of configurations having any number of modules.

The UI controller has the option of adjusting the priority level, or bids, for the UI module (step 330). This may be necessary in cases where there is an open platform for UI modules and many different people/entities may create UI modules. In such case, how a UI module sets its priority may vary greatly, and the UI Controller may need to adjust priority levels if it finds certain modules tend to consistently bid too high or too low. In certain embodiments, upgrading or downgrading a UI module's priority is based on the type of information the UI module displays, where certain categories or modules will always have a higher priority than others. For example, if the Deals module submits a bid with a high priority, but the Traffic and Road Alerts module has an alert regarding an upcoming road accident, the UI controller may adjust the priority levels such that the Traffic and Road Alerts module has a higher priority than the Deals module (step 340).

The UI controller informs the UI modules whether or not they have received a spot in the user interface (step 350). It also reports any clicks to the applicable UI modules that are displayed so that the UI modules can take into account the clicks or lack of clicks in determining future priority (step 360). The UI controller will then update the user interface content as the mode changes (and hence the number of available user interface spots changes) or as new higher priority bids arrive (step 370). In certain embodiments, the UI controller monitors the bids from the UI modules continuously. In other embodiments, the UI controller will periodically poll for new bids from the UI modules.

In certain embodiments, if the UI controller receives a higher-than-average bid from a UI module, it may display the UI module in the user interface along with an alert to bring attention to the UI module. For example, the applicable UI module may be backlit in the user interface.

Figure 4:
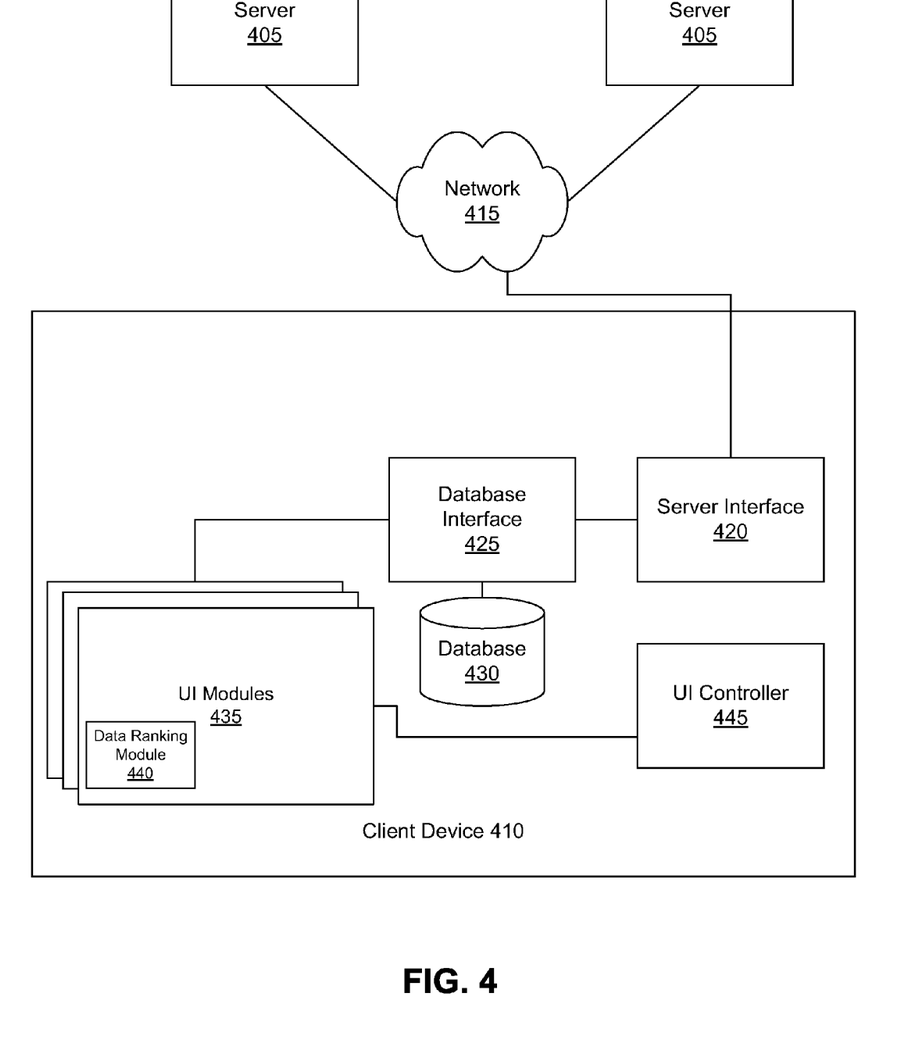
FIG. 4 is a diagram that illustrates an exemplary software architecture for the present invention.

FIG. 4 illustrates an example of a software architecture that may be used by a computer system. As a person skilled in the art would understand, any number of software architectures may be used within the scope of the present invention. In FIG. 4, one or more servers 405 are connected to a client device 410 via a network 415. In one embodiment, the servers 405 download broadcast data in various categories to the client devices. Examples of the servers may be transit servers, reader servers, and hybrid servers. The client device 410 has a server interface 420 for interfacing between the client device and the one or more servers 405. The server interface 420 is connected to a database interface 425 and a database 430, which stores user profile information and past user history, among other data. Database 430 also temporarily stores data downloaded to client devices. The database interface 425 is connected to a plurality of UI modules 435, where each of the UI modules has a data-ranking module 440. As described in FIG. 2, the data ranking module 440 ranks data downloaded to the client device 410 that is relevant to the topic category of the UI modules. The UI modules 435 are connected to a UI controller 445. In one embodiment, the UI modules 435 and UI controller 445 operate as discussed with respect to FIGS. 2 and 3. A person skilled in the art would understand that the computer system may also have a memory or other physical storage medium for storing software instructions and one or more processors for executing the software instructions.

FIGS. 5A and 5B illustrate an exemplary user interface for a navigation device. FIG. 5A is a "dashboard" view in which five UI modules are displayed, where one UI module, the map 505, is larger than the other four modules and highlights the locations of the other four modules relative to the user. The other four modules displayed are a "Weather" module 510 that provides weather information, the "Gas Price" module 515, the Friends module 520, and the Deals module 525. FIG. 5B illustrates another "dashboard" configuration, where eight modules are displayed. Included are the Weather module 510, the Gas Price module 515, the Friends module 520, the Deals module 525, the Spaces module 530, the Traffic and Road Alerts module 535, a Yelp module 540, and an Eco Driving module 545. From either of the interfaces shown in FIGS. 5A and 5B, the user can click on a Search button 550 or add a particular destination represented by one of the modules to the user's Drive List 555. In one embodiment, the dashboard view is used when the device is in a handheld or on-desk mode.

Figure 6:
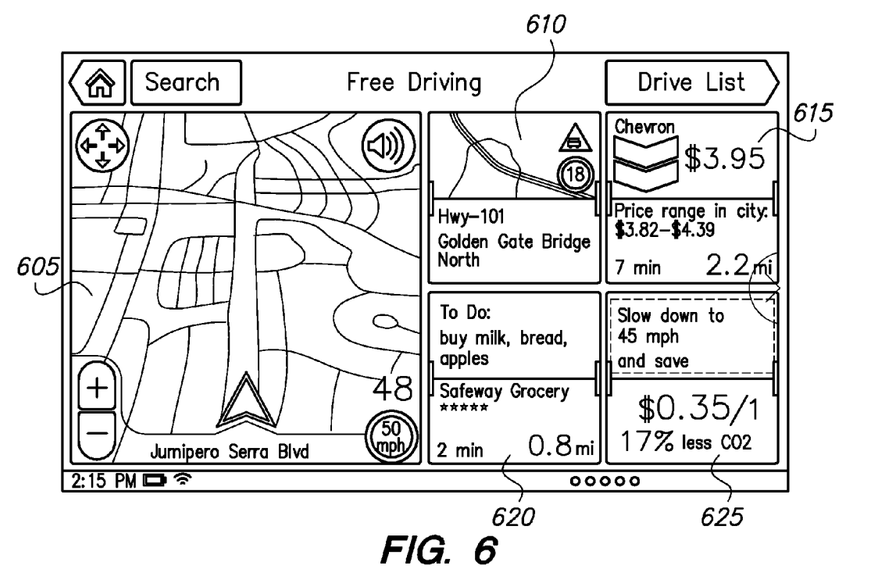
FIG. 6 illustrates another exemplary implementation of the user interface in a "Driving Mode" on a navigation device.

FIG. 6 illustrates an exemplary user interface for a navigation device in a "Driving" mode. Similar to FIGS. 5A and 5B, FIG. 6 displays five UI modules, where one UI module, the map 605, is larger than the other four modules and illustrates the path that the user is taking. The map module 605 may provide audio, as well as visual interactivity. There may be the option for zooming in or out or providing related information, such as the user's speed along the highway. The other four modules displayed are the Traffic and Road Alerts module 610, the Gas Prices module 615, the To Do List module 620, and the Eco Driving module 625, all of which provide the user with information related to his or her drive.

As seen in FIGS. 5A, 5B, and 6, the user interfaces may have any number of modules, each of which operate independently according to their own software model. As two representative examples, FIG. 7 will describe one embodiment, the "Gas Price" module, and FIG. 8 will describe another embodiment, the "Friends" module.

Figure 7:
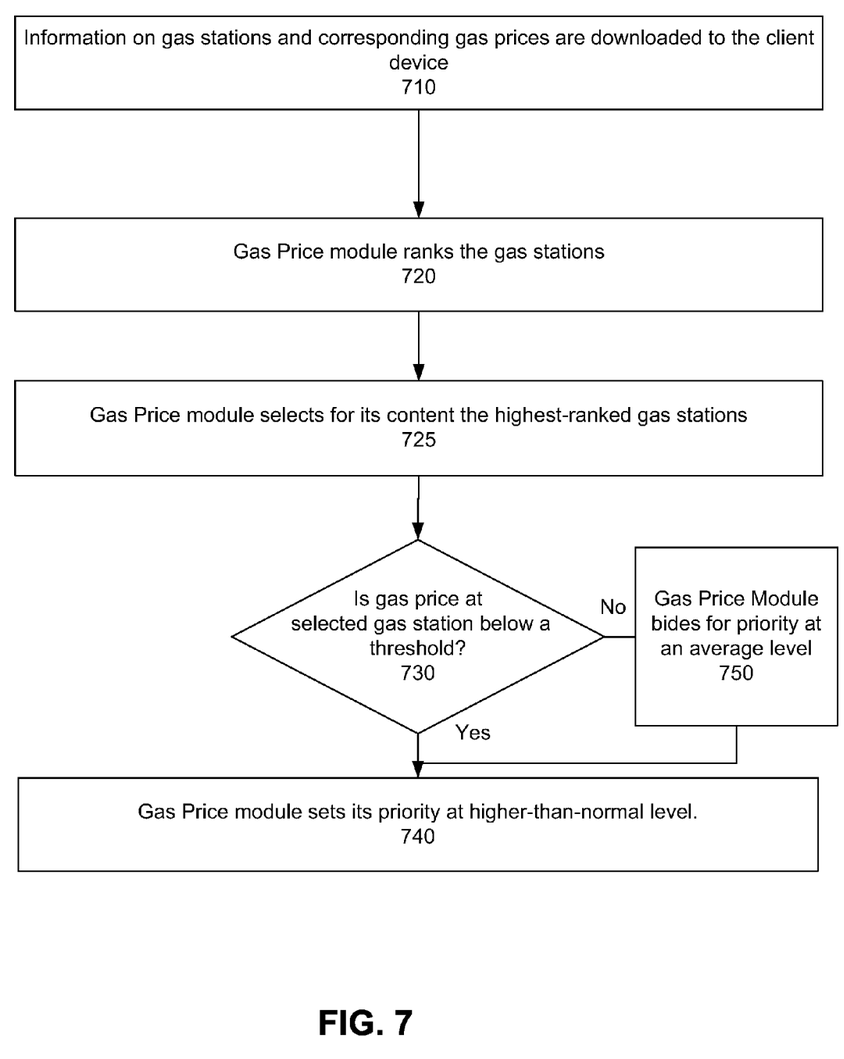
FIG. 7 is a flowchart that illustrates how a "Gas Price" UI module operates as an exemplary embodiment.

FIG. 7 illustrates an example of the operation of a UI module that displays gas prices for a navigation device/application. Information on gas stations and corresponding gas prices are downloaded to the client device (step 710). The Gas Price module examines gas prices for gas stations that are currently near the user or, if the user is driving, will be near the user in the near future (step 720). The Gas Price module ranks the gas stations, taking into account the gas price, the user's location, proximity to freeway exits (if applicable), user preferences, and any other applicable factors. The Gas Price module selects for its content the highest-rank gas station (step 725). The Gas Price Module then determines if the price at the selected gas station is below a threshold (step 730). The threshold may be based on historical averages, gas prices at gas stations that a user frequents, and/or gas prices in the user interface on which a user clicks. If the price is below the threshold, the Gas Price module sets its priority (i.e., its bid for UI space) at a higher-than-normal (for the Gas Price Module) level (step 740). Otherwise, the Gas Price Module bids for priority at what is an "average" or "medium" level for the Gas Price module (step 750).

Figure 8:
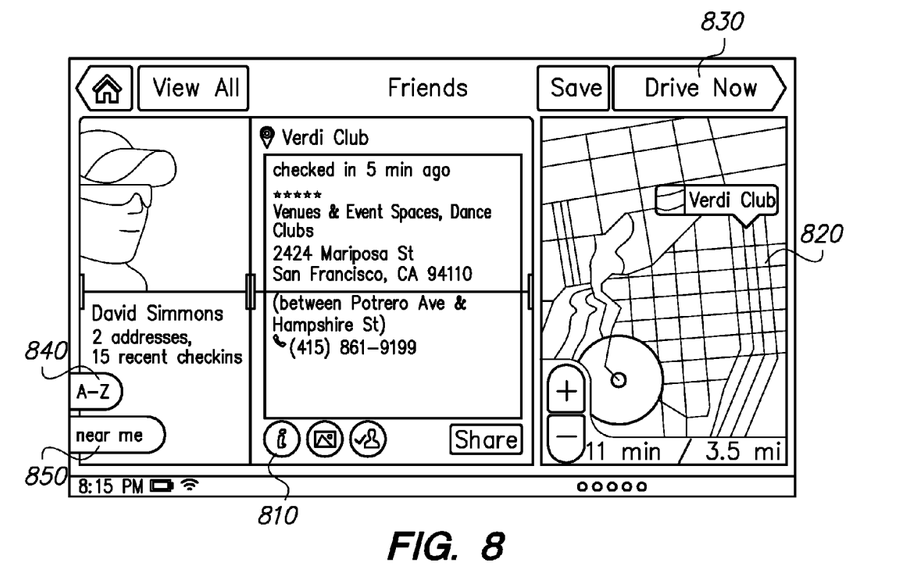
FIG. 8 illustrates another exemplary implementation of the user interface in a "Friends Mode" on a navigation device.

The Friends module provides an interface whereby the user can view the places that his or her friends have "checked in" both in the past and at present. For example, if one friend checked in to a local restaurant on Four Squares and another friend checked in to the same restaurant on Facebook, the Friends module would disambiguate the difference between the social media programs and display to the user that two friends are currently checked in to the restaurant, which may be of some interest to the user who may want to navigate to that location. While two friends at the same location may be of medium interest, if two friends are currently checked in and the user has visited the location several times previously, the Friends module may assign the data a higher priority because of the increase in interest level. If, however, two friends are currently checked in, the user has visited the location several times previously, and a coupon is available for the location, then the Friends module may assign the data the highest priority in submitting a bid to the UI controller.

In one embodiment, there is a "home" view and an "active" view for the UI modules. In the home view, the UI modules display high-level, summary content. In the "active" view, which is displayed when a user clicks (i.e., selects) a UI module, more detailed information is displayed about the content on which the user clicked. FIG. 8 illustrate an example of the "active view" of a Friends module. In this example, the user had clicked on Friend module 520 in FIG. 5A to obtain more information about one of the user's friends, David Simmons. In the active view, the Friends module displays in window 810 more information about the Verdi Club into which Mr. Simmons has checked in. In addition, the active view of the Friends module provides on a map 820 of the route between the user's current location and the Verdi Club. By pressing the Drive Now button 830, the user interface will provide the user with step-by-step instructions of how to navigate to the Verdi Club. If, however, the user would like to look up information about or the location of another friend, the user can scroll through his or her contact list, by pressing the A-Z button 840 or search for friends in the immediate vicinity by pressing the Near Me button 850.

Although examples of the invention have been described with respect to navigation devices, the invention is not limited to navigation devices or applications. The invention may be used to generate user interfaces for various types of application and on various types of devices.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for displaying a user interface (UI) on a computing device, wherein the user interface displays information for a plurality of categories of content, the method comprising:
   executing a plurality of UI modules on the computing device, wherein each UI module is a software component that provides content within a particular category for display in the user interface, wherein each UI module ranks data relevant to its category based at least in part on user profile information and determines its content by selecting the highest-ranked data in its category for bidding for display in the user interface such that any lesser-ranked data in its category is not selected for bidding for display in the user interface, determines a priority level of the highest-ranked data in its category for the purpose of bidding for user interface space against other UI modules, and bids for user interface space using the determined priority level of the highest-ranked data in its category, and wherein at least one UI module ranks data associated with physical locations, and, in ranking the data, takes into account the proximity of said physical locations to the device; and
   executing a UI controller on the computing device, wherein the UI controller is a software component that receives bids from the UI modules, determines the number of available spots for UI modules in the user interface, and selects UI modules associated with the highest priorities for display in the available user interface spots, wherein each bid received from a UI module includes the priority level of the highest-ranked data in its category as determined by the UI module and the UI controller is able to upgrade or downgrade said priority level based at least in part on the category of content the UI module displays.

2. The method of claim 1, wherein the UI controller informs UI modules whether or not they won space in the user interface and reports clicks to UI modules that are clicked on, and wherein each UI module displayed in the user interface uses information on whether or not it was clicked on when displayed in the user interface in determining future priority levels.

3. The method of claim 1, wherein the UI controller monitors bids from UI modules and, in response to receiving a bid from a UI module with a higher priority than a UI module currently being displayed in the user interface, the UI controller replaces the currently-displayed UI module with the UI module having the higher priority.

4. The method of claim 1, wherein the user interface has a plurality of modes and the UI controller determines the number of available spots for UI modules in the user interface based on the current mode of the user interface.

5. The method of claim 1, wherein the data in various categories was downloaded to the computing device.

6. The method of claim 1, wherein a UI module uses user profile information, current context, and past user click history to determine the priority level of the highest-ranked data in its category.

7. The method of claim 6, wherein the user profile information includes past behavior and expressed user interests.

8. The method of claim 1, wherein the computing device is a navigation device.

9. A computing device having a user interface (UI) display, the device comprising:
   a plurality of UI modules executing on one or more processors of the computing device, wherein each executing UI module is a software component that provides content within a particular category for display in the user interface, wherein each UI module ranks data relevant to its category based at least in part on user profile information and determines its content by selecting the highest-ranked data in its category for bidding for display in the user interface such that any lesser-ranked data in its category is not selected for bidding for display in the user interface, determines a priority level of the highest-ranked data in its category for the purpose of bidding for user interface space against other UI modules, and bids for user interface space using the determined priority level of the highest-ranked data in its category, and wherein at least one UI module ranks data associated with physical locations, and, in ranking the data, takes into account the proximity of said physical locations to the device; and
   a UI controller executing on one or more processors of the computing device, wherein the UI controller is a software component that receives bids from the UI modules, determines the number of available spots for UI modules in the user interface, and selects UI modules associated with the highest priorities for display in the user interface, wherein each bid received from a UI module includes the priority level of the highest-ranked data in its category as determined by the UI module and the UI controller is able to upgrade or downgrade said priority level based at least in part on the category of content the UI module displays.

10. The computing device of claim 9 further comprising:
    a data ranking module executing on each of the plurality of UI modules, wherein the data ranking module is a software component that ranks data downloaded from a remote server to the computing device, wherein the ranking indicates a level of likely interest to a user of the computing device, wherein the data ranking module uses the user profile information to rank the data, and wherein one or more of the UI modules use the ranked data to determine their content.

11. The computing device of claim 10, wherein the user profile information includes places the user has been and content on which the user has clicked in the user interface.

12. A computer program embodied on a non-transitory computer-readable medium and comprising code, that, when executed by one or more processors on a computing device, enables the computer system to perform the following method for generating user interface (UI) modules on the computing device:

providing a plurality of UI modules, wherein each UI module is a software component that provides content within a particular category for display and wherein each UI module ranks data relevant to its category based at least in part on user profile information and determines its content by selecting the highest-ranked data in its category for bidding for display in the user interface such that any lesser-ranked data in its category is not selected for bidding for display in the user interface, determines a priority level of the highest-ranked data in its category for the purpose of bidding for user interface space against other UI modules, and bids for user interface space using the determined priority level of the highest-ranked data in its category, and wherein at least one UI module ranks data associated with physical locations, and, in ranking the data, takes into account the proximity of said physical locations to the device;

receiving bids from the plurality of UI modules for space in the user interface;

determining the number of available spots for UI modules in the user interface; and selecting UI modules associated with the highest priorities for display in the available user interface spots, wherein each bid received from a UI module includes the priority level of the highest-ranked data in its category as determined by the UI module and the priority level of each UI module is able to be upgraded or downgraded based at least in part on the category of content the UI module displays.

13. The computer program of claim 12, wherein the method further comprises:

informing the UI modules whether or not they have been selected for a space in the user interface; and reporting clicks to UI modules that are clicked on, wherein the UI modules use click information, including absence of a click, in determining future priority levels.

14. The computer program of claim 13, wherein the method further comprises:

monitoring bids from UI modules; and in response to receiving a bid from a UI module with a higher priority than a UI module currently being displayed in the user interface, replacing the currently-displayed UI module with the UI module having higher priority.

15. The computer program of claim 14, further comprising:

adjusting the number of available spots for UI modules in response to a change in mode for the user interface.

16. The computer program of claim 12, wherein the UI modules rank data relevant to their categories and determine their content from data downloaded to the computing device.

* * * * *